United States Patent
Ohzono

(10) Patent No.: US 8,388,201 B2
(45) Date of Patent: Mar. 5, 2013

(54) HEADLIGHT UNIT AND STRADDLE-TYPE VEHICLE

(75) Inventor: Gen Ohzono, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 670 days.

(21) Appl. No.: 12/187,204

(22) Filed: Aug. 6, 2008

(65) Prior Publication Data
US 2009/0040779 A1    Feb. 12, 2009

(30) Foreign Application Priority Data
Aug. 8, 2007   (JP) ................. 2007-206921

(51) Int. Cl.
*F21V 7/00*   (2006.01)
(52) U.S. Cl. .............. 362/516; 362/517; 362/518
(58) Field of Classification Search ........... 362/459–549
See application file for complete search history.

(56) References Cited

U.S. PATENT DOCUMENTS

| | | | | |
|---|---|---|---|---|
| 4,213,171 A | * | 7/1980 | Sassmannshausen | 362/310 |
| 5,010,458 A | * | 4/1991 | Fraizer | 362/516 |
| 5,556,193 A | * | 9/1996 | Ferrell | 362/294 |
| 5,562,338 A | * | 10/1996 | Yamamoto | 362/521 |
| 6,698,912 B2 | * | 3/2004 | Yang | 362/516 |
| 2007/0230203 A1 | * | 10/2007 | Ono | 362/516 |

FOREIGN PATENT DOCUMENTS
JP        08-148004        6/1996

* cited by examiner

*Primary Examiner* — William Carter
(74) *Attorney, Agent, or Firm* — Keating & Bennett, LLP

(57) ABSTRACT

A headlight unit includes a reflector that is concave in shape and has left and right reflection surfaces for reflecting light emitted by a headlight bulb in a desired direction. Protection covers cover outer edge sections of the reflector and have a color different from that of the left and right reflection surfaces.

20 Claims, 10 Drawing Sheets

US 8,388,201 B2

HEADLIGHT UNIT AND STRADDLE-TYPE VEHICLE

RELATED APPLICATIONS

This application claims the benefit of priority under 35 USC 119 of Japanese patent application no 2007-206921, filed on Aug. 8, 2007, which application is hereby incorporated by reference in its entirety.

BACKGROUND OF THE INVENTION

1. Field of the Invention

This invention relates to a headlight unit for a straddle-type vehicle having a reflector with a concave shape and a reflection surface that reflects light emitted from a headlight bulb in a desired direction.

2. Description of Related Art

Straddle-type vehicles such as motorcycles often include a front cowl (exterior cover) having a headlight unit arranged in front of a steering head pipe.

The headlight unit generally has a head light bulb, a concavity shaped reflector that reflects light emitted from the headlight bulb toward a desired direction and a headlight lens disposed in front of the reflector. A reflection surface deposited with aluminum or the like is typically formed on the reflector in order to efficiently reflect light emitted from the headlight bulb.

An aiming mechanism may turn the reflector up and down along with the headlight bulb in order to adjust a direction of light emitted from the headlight unit (bulb) (see, for example, JP-A-Hei 8-148004 (page 3, FIG. 3)).

However, the headlight unit described above has a problem in that the delicate reflection surface deposited with aluminum or the like is damaged by contact between an outer edge section of the reflector and the headlight during assembly of the headlight unit.

In addition, when the reflector is rotated up and down excessively using the aiming mechanism, the outer edge section of the reflector may contact the headlight lens and damage the reflection surface.

SUMMARY OF THE INVENTION

The present invention addresses these problems and provides a headlight unit that can prevent damage of a reflection surface of a reflector during assembly of the headlight unit or during operation of the aiming mechanism, and a straddle-type vehicle that includes this head light unit.

To solve these problems, one aspect of the present invention is a headlight unit that includes a reflector having a concave shape and a reflection surface that reflects light emitted from a headlight bulb in a desired direction. A cover section covers at least part of an outer edge section of the reflector and has an appearance that is different from that of the reflection surface.

In one embodiment, the cover section has a color that is different from that of the reflection surface.

That is, the outer edge section, which tends to come in contact with the headlight lens or the like, can be easily visually identified by operation workers at the time of assembly of the headlight unit. Furthermore, the outer edge section is securely protected by the cover section. Thus, the delicate reflection surface, which is disposed with aluminum or the like, is protected against damage at the time of the assembly.

Also, for a headlight unit having an aiming mechanism, the reflection surface is protected against damage if the outer edge section of the reflector is rotated up and down excessively and contacts the headlight lens.

In another aspect of the invention, the cover section is disposed in series along the outer edge section.

In another aspect of the invention, the cover section is translucent.

In another aspect of the invention, the cover section is disposed at a lower portion of the outer edge section of the reflector, an exterior cover of a straddle-type vehicle is arranged in front of a lower portion of the reflector, and the exterior cover is arranged on a straight line running through at least a light emission center of the headlight bulb and the cover section in a side view of the straddle-type vehicle.

In another aspect of the invention, the cover section is attached to the outer edge section and a separate member from the reflector.

In another aspect of the invention, a slit is formed on the outer edge section, and a side end of the cover section is fit to the slit.

In another aspect of the invention, the cover section is in a strip shape and arranged along the outer edge section.

In another aspect of the invention, the cover section is formed by paint applied to the outer edge section.

Another aspect of the invention is a straddle-type vehicle including a headlight unit as described above.

According to the present invention, a headlight unit that avoids damage of a reflection surface of a reflector during assembly of the headlight unit or operation of an aiming mechanism, and a straddle-type vehicle that includes the head light unit, are provided.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
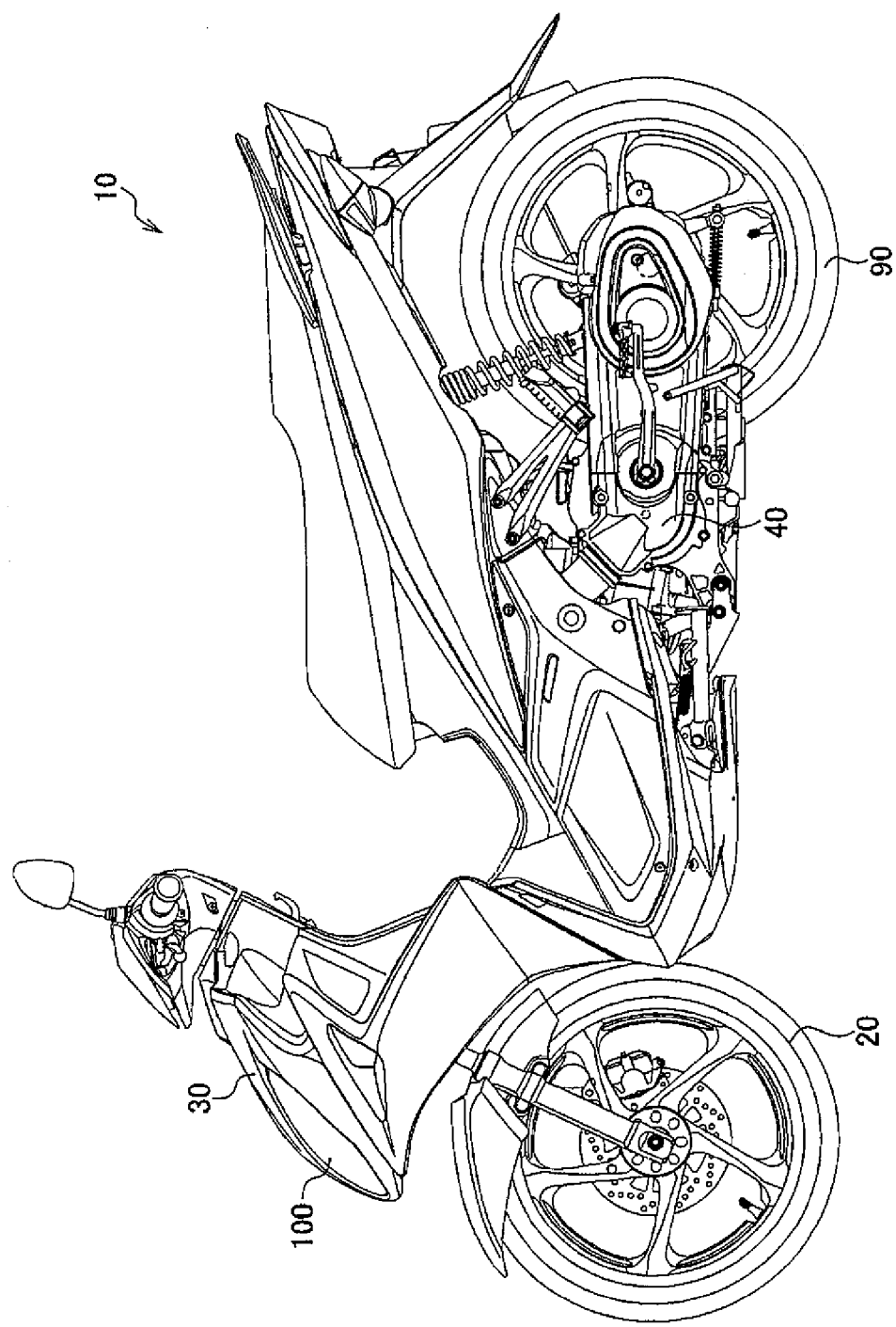
FIG. 1 is a left side view of a motorcycle in accordance with an embodiment of the present invention.

An embodiment of a straddle-type vehicle according to the present invention is now described with reference to the drawings. More specifically, the overall schematic structure of the straddle-type vehicle (1), the structure of the headlight unit (2), the structure of the reflector (3), action and effect (4) and other embodiments (5) are described.

In the following description in regard to the drawings, identical or similar parts are denoted by identical or similar reference numerals. Each drawing is shown schematically, and may represent different dimensional ratios and the like from those of the actual parts. Hence, specific dimensions and the like should be determined in consideration of the following description. Further, different drawings include elements that have different dimensional relations and ratios.

(1) Overall Schematic Structure of the Straddle-Type Vehicle

Figure 2:
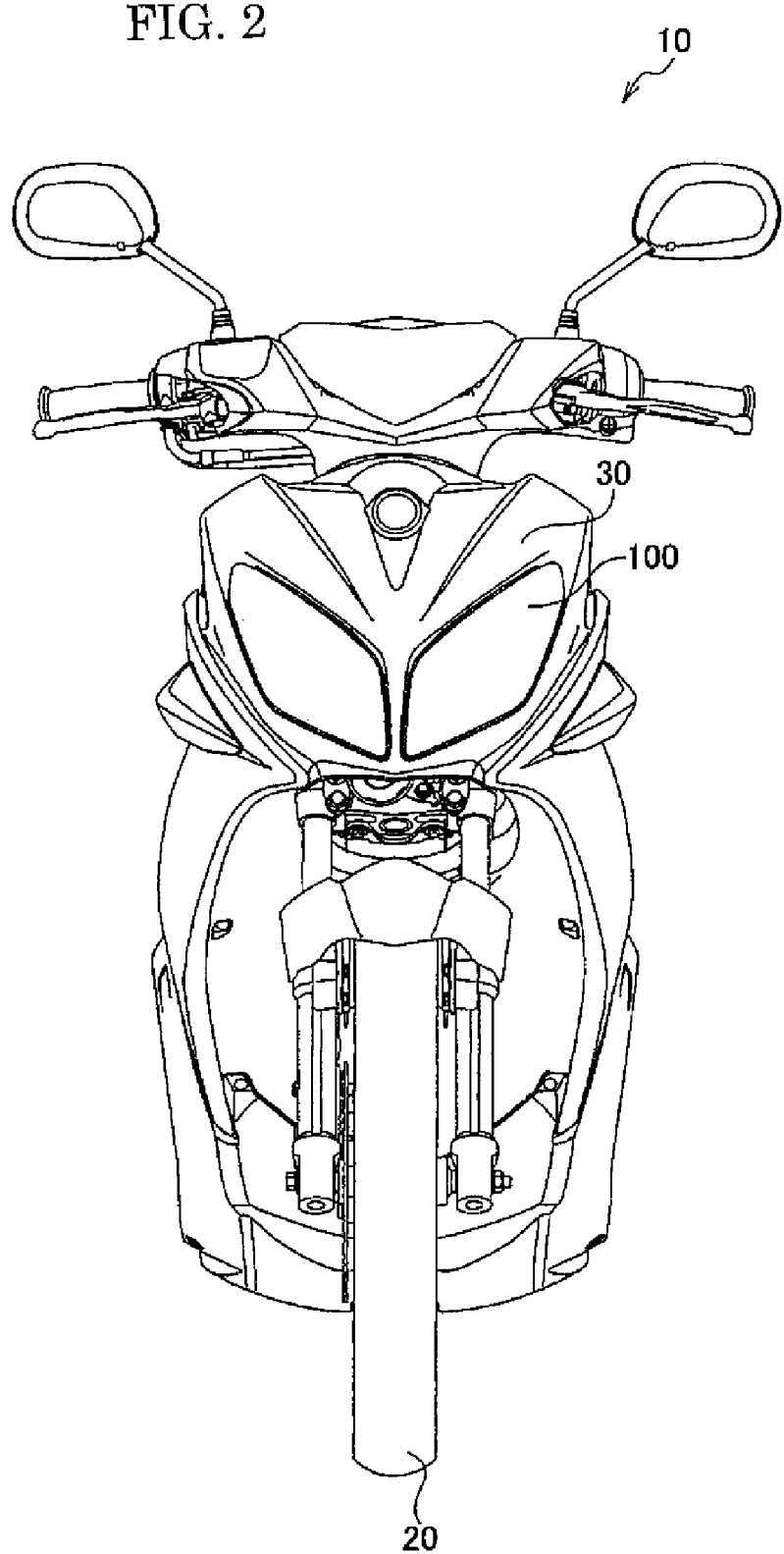
FIG. 2 is a front view of the motorcycle in accordance with an embodiment of the present invention.

FIG. 1 is a left side view of a motorcycle 10 that is a straddle type vehicle in accordance with the present invention. FIG. 2 is a front view of a motorcycle 10. As shown in FIGS. 1 and 2, motorcycle 10 is an underbone-type motorcycle having a body frame disposed at a lower position as compared with that of a general straddle-type motorcycle.

Motorcycle 10 includes a front wheel 20 and a rear wheel 90. An engine 40 generates a driving force that drives rear wheel 90. A front cowl 30 is arranged above front wheel 20. In this embodiment, front cowl 30 constitutes an exterior cover. A headlight unit 100 attached to front cowl 30 emits light forward of motorcycle 10. In this embodiment, headlight unit 100 is a dual light type including headlight bulbs 150L, 150R (FIG. 3).

(2) Structure of the Headlight Unit

Figure 3:
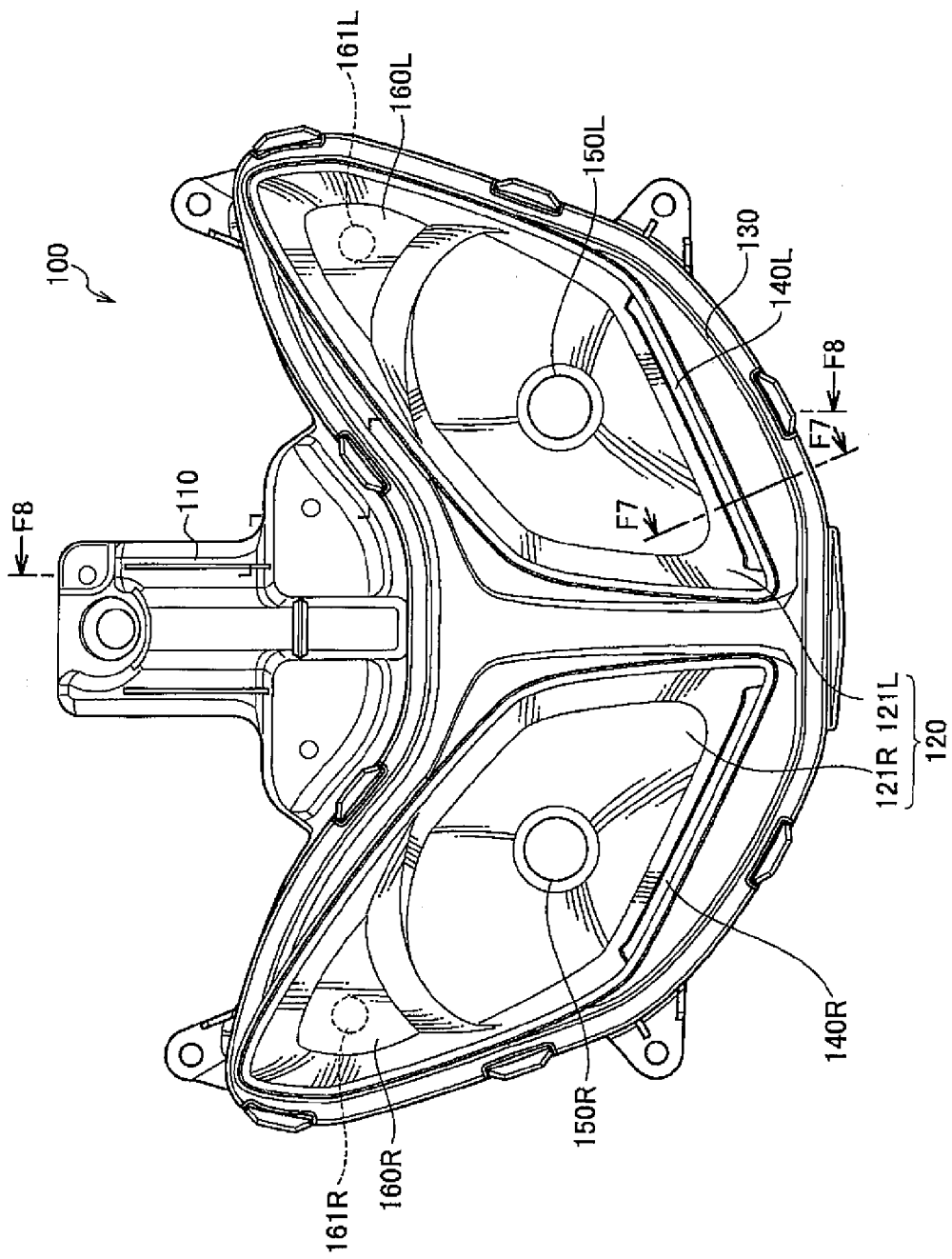
FIG. 3 is a front view of a headlight unit in accordance with an embodiment of the present invention.
Figure 4:
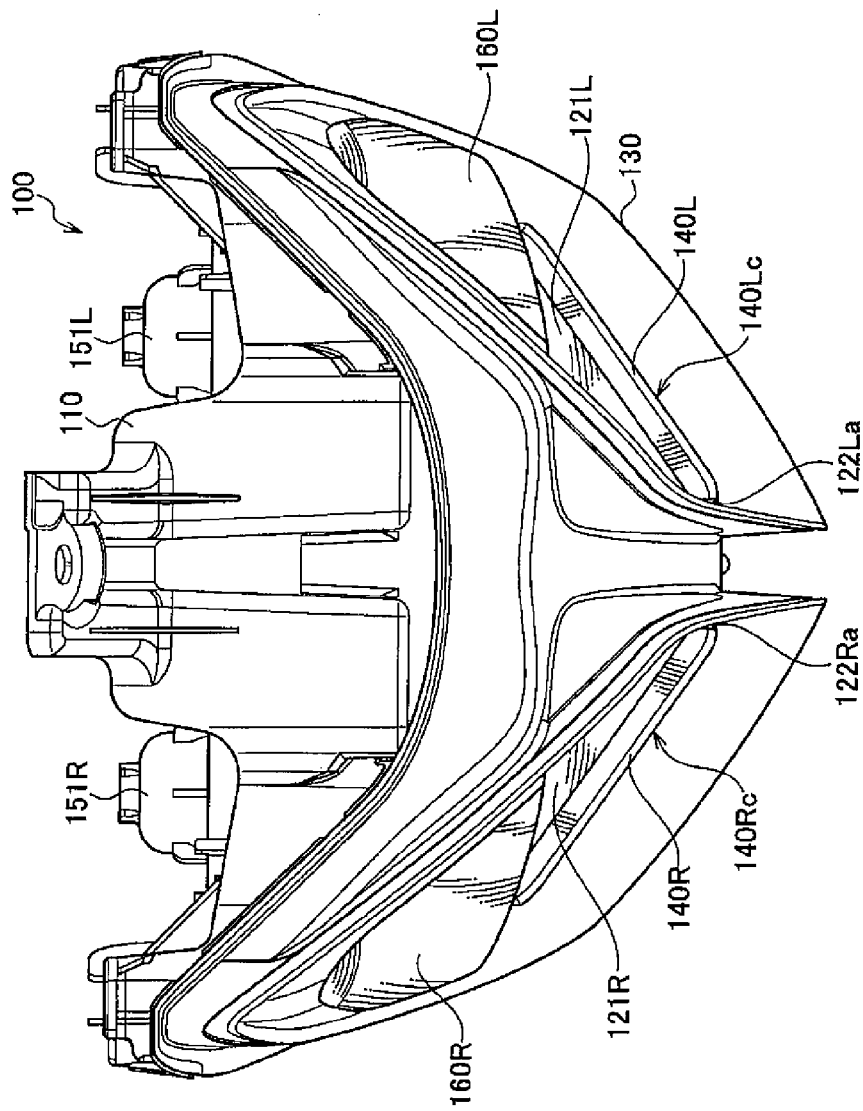
FIG. 4 is a plan view of the headlight unit in accordance with an embodiment of the present invention.
Figure 5:
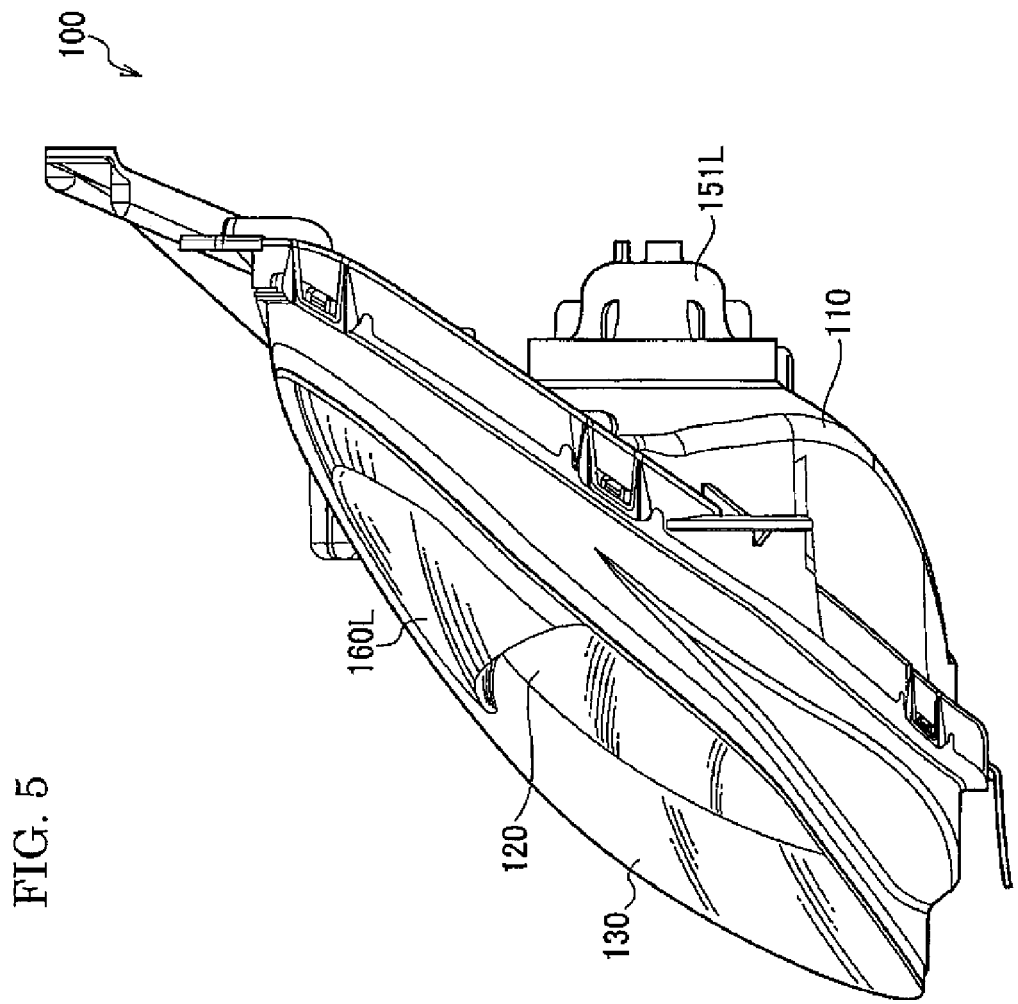
FIG. 5 is a left side view of the headlight unit in accordance with an embodiment of the present invention.

FIG. 3 is a front view of headlight unit 100. FIG. 4 is a plan view of headlight unit 100. FIG. 5 is a left side view of headlight unit 100. As shown FIGS. 3-5, headlight unit 100 is constituted by a headlight body 110, a reflector 120 and a headlight lens 130.

Reflector 120 and headlight lens 130 are attached to headlight body 110. A bulb hole through which headlight bulbs 150L, 150R are inserted is formed on a rear portion of headlight body 110. The bulb hole is covered by removable caps 151L, 151R.

Reflector 120 reflects light emitted by headlight bulbs 150L, 150R in a desired direction, which is specifically forward of motorcycle 10, while regulating light cast to an opposite vehicle. Reflector 120 is attached to headlight body 110.

Position lamp sections 160L, 160R are arranged above reflector 120. As shown in FIG. 3, a position lamp 161L (161R) arranged in position lamp section 160L (160R) is covered by a position lamp lens 162L (162R) that is in the shape of a triangle.

A headlight lens 130 is attached to headlight body 110. Headlight lens 130 is made of resin or glass, and is transparent and colorless.

Protection covers 140L, 140R are attached below reflector 120 and cover outer edge sections 122L, 122R (FIG. 6) of reflector 120. Protection covers 140L, 140R in this embodiment constitute a cover section.

(3) Structure of the Reflector

The structure of the reflector is now described. Specifically, the shape of the reflector and the cover section (3.1) and the aiming mechanism (3.2) are described.

(3.1) Shape of the Reflector and the Cover Section

Figure 6:
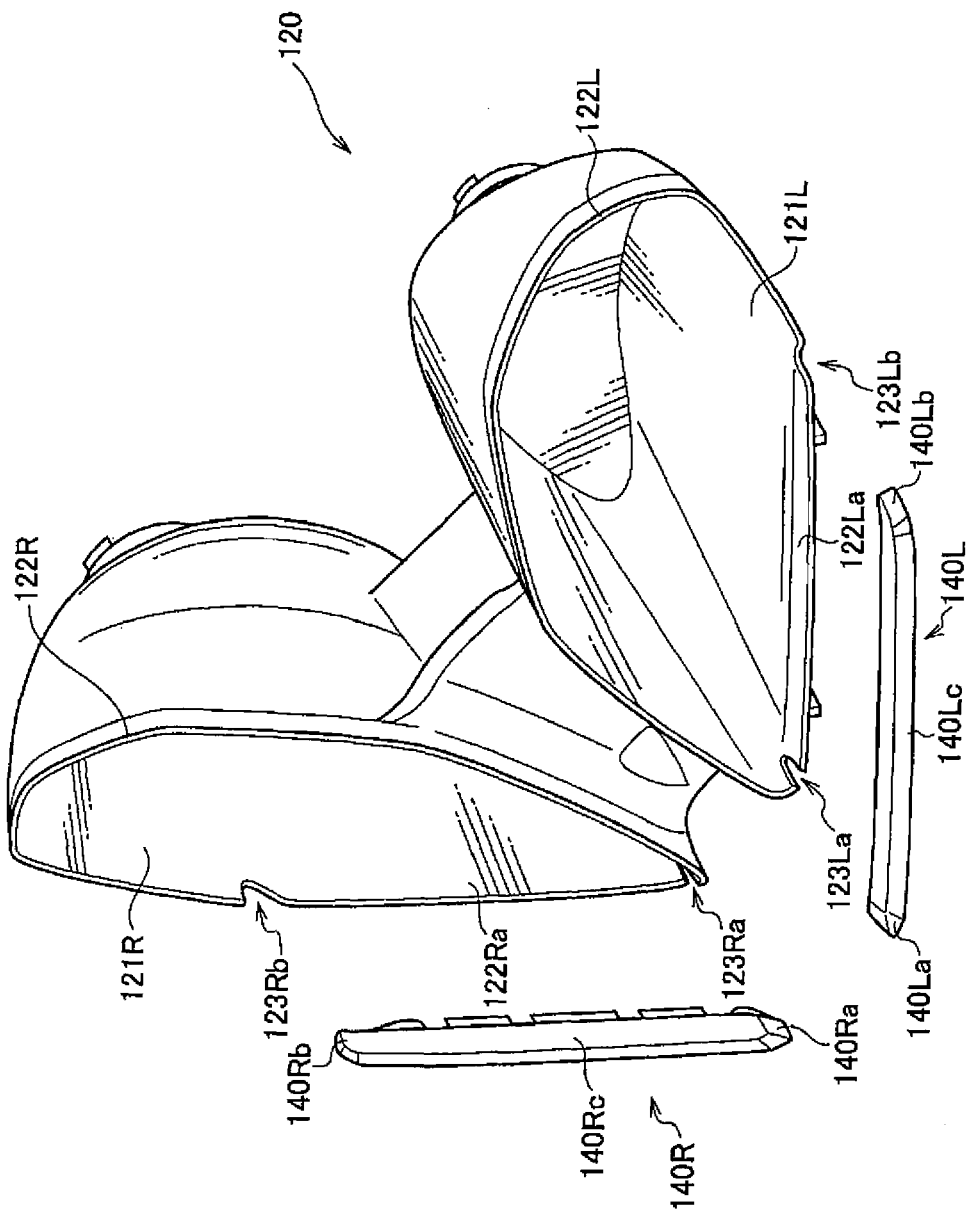
FIG. 6 is an exploded perspective view of a reflector and protection covers in accordance with an embodiment of the present invention.
Figure 7:
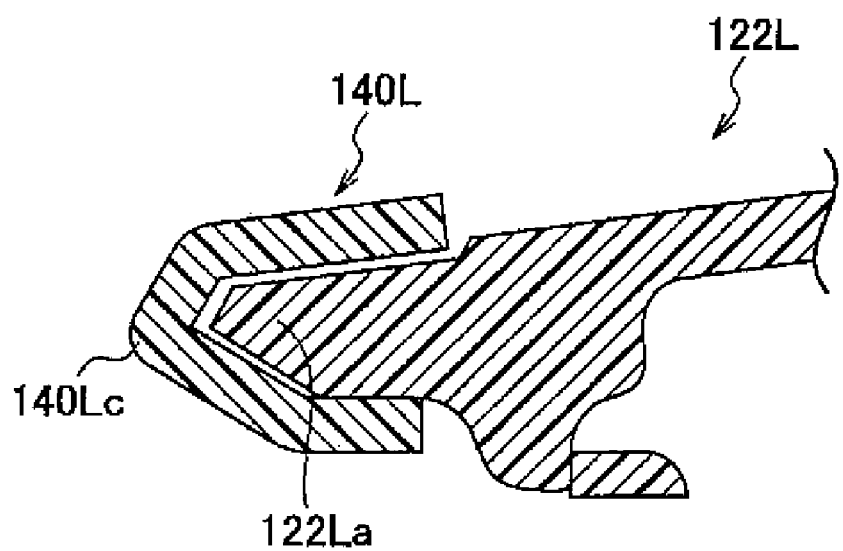
FIG. 7 is a sectional view of the reflector and a protection cover taken along line F7-F7 of FIG. 3.

FIG. 6 is an exploded perspective view of reflector 120 and protection covers 140L, 140R constituting the cover section in this embodiment. FIG. 7 is a sectional view of reflector 120 and protection cover 140L, taken along line F7-F7 of FIG. 3.

Reflector 120 has a left reflection surface 121L and a right reflection surface 121R. Reflection surfaces 121L and 121R are concave in shape. Head light bulb 150L is arranged inside of left reflection surface 121L and head light bulb 150R is arranged inside of right reflection surface 121R (FIG. 3).

Aluminum is disposed on reflection surfaces 121L and 121R. That is, reflection surfaces 121L and 121R are specular surfaces in generally a silver color. Reflection surfaces 121L and 121R have a shape that reflects light emitted by headlight bulbs 150L and 150R to a desired direction. Instead of aluminum deposition, highly reflective (high intensity) paint may be applied to reflection surfaces 121R.

Protection cover 140L is attached to outer edge section 122L of left reflection surface 121L. Specifically, protection cover 140L is fit to a front edge section 122La of left reflection surface 121L. Likewise, protection cover 140R is fit to a front edge section 122Ra of right reflection surface 121R. Thus, protection cover 140L (140R) is a separate member from reflector 120, and attached to outer edge section 122L (122R). Specifically, protection cover 140L (140R) covers part of outer edge section 122L (122R). More specifically, protection cover 140L (140R) is in a strip shape, and disposed along outer edge section 122L (122R).

Slits 123La, 123Lb (123Ra, 123Rb) are formed on both side ends of front edge section 122La (122Ra).

A concave section in which front edge section 122La (122Ra) is fit is formed on protection cover 140L (140R). Protection cover 140L (140R) is fit to front edge section 122La (122Ra). Specifically, side ends 140La, 140Lb (140Ra, 140Rb) of protection cover 140L (140R) are fit to slits 123La, 123Lb (123Ra, 123Rb). When protection cover 140L is fit to front edge section 122La (122Ra), a position of front edge section 122La (122Ra) and a position of front edge 140Lc (140Rc) of protection cover 140L (140R) are aligned (FIG. 4).

Protection covers 140L, 140R have an appearance that is different from that of reflection surfaces 121L and 121R. In one embodiment, protection covers 140L, 140R are painted in a color different from reflection surfaces 121L and 121R, which are specular surfaces and painted generally in a silver color. Specifically, protection covers 140L, 140R are painted in blue. Also, in this embodiment, protection covers 140L, 140R are formed by translucent resin painted in blue. Here, translucent means not opaque and having a transmittance of visible light that is a predetermined value (for example, 10%) or greater.

(3.2) Aiming Mechanism

Figure 8:
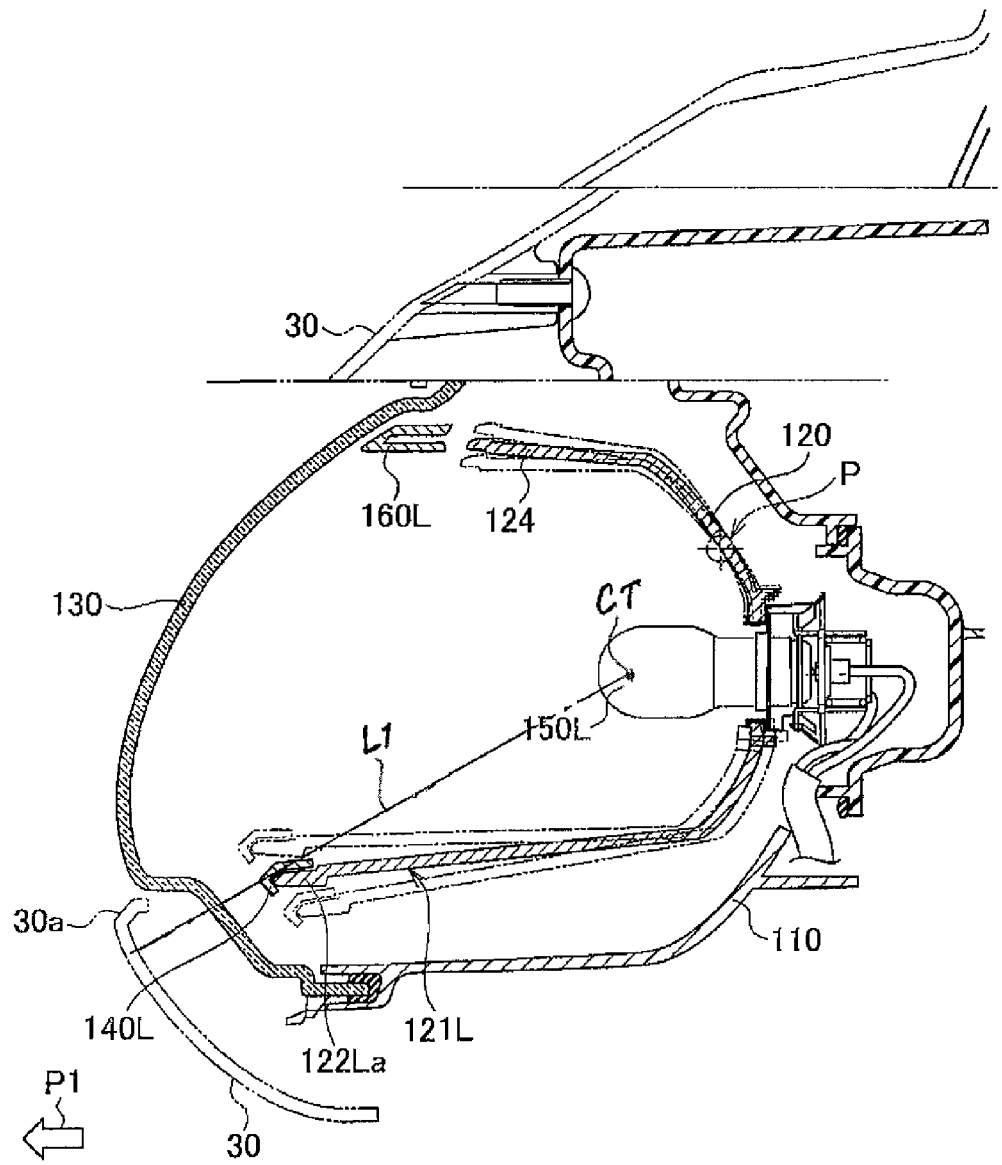
FIG. 8 is a cross sectional view of the headlight unit taken along line F8-F8 of FIG. 3.

FIG. 8 is a cross sectional view of headlight unit 100 taken along line F5-F5 of FIG. 3. As shown in FIG. 8, headlight bulb 150L is arranged on a bottom portion of left reflection surface 122L that is concave in shape. Front edge section 122La is extended forward of motorcycle 10 (P1 direction in the drawing). Protection cover 140L is fit to front section 122La.

Reflector 120 is rotatably supported in the up and down direction by the aiming mechanism. Specifically, reflector 120 can rotate about aiming point P in the up and down direction.

Front cowl 30 is disposed above and below the headlight lens. Specifically, front cowl 30 is disposed in front of front edge section 122La located in a lower portion of reflector 120.

In this embodiment, in the side view of motorcycle 10, an edge section 30a of the opening section of headlight unit 100 formed on front cowl 30 is located on the straight line L1 that runs through bulb center CT (emission center) of headlight bulb 150L and protection cover 140L.

Headlight bulb 150R side has a cross sectional shape generally symmetrical to head light bulb 150L side shown in FIG. 8.

(4) Action and Effect

In headlight unit 100, outer edge section 122L (122R) of reflector 120 is covered by protection cover 140L (140R). Also, protection cover 140L (140R) is painted in a color, which is blue in this embodiment, different from left reflection surface 121L (right reflection surface 121R).

That is, outer edge sections 122L, 122R of reflector 120 that tend to come into contact with headlight lens 130 during assembly of headlight unit 100, can be easily identified by an operation worker. Furthermore, outer edge section 122L (122R), specifically front edge section 122La (122Ra) can be protected securely by protection cover 140L (140R). Therefore, during the assembly, the delicate left reflection surface 121L (right reflection surface 121R), to which aluminum is deposited (or high intensity paint is applied), is protected against damage.

Also, in headlight unit 100 having the aiming mechanism, even if front edge section 122La (122Ra) of reflector 120 contacts headlight lens 130 by too much rotation to the lower direction, reflection surfaces 121L and 121R are protected against damage. Furthermore, as shown in FIG. 8, in this embodiment, enough space is maintained between outer edge 124 and the outer edge of position lamp section 160L in an upper portion of reflector 120, so that outer edge 124 of reflector 120 avoids damage.

Furthermore, since painted protection cover 140L (140R) is fit to front edge section 122La (122Ra) of reflector 120, painted protection cover 140L (140R) is reflected in left reflection surface 121L (right reflection surface 121R). Therefore, left reflection surface 121L (right reflection surface 121R) are shown as if painted.

Also, in this embodiment, protection cover 140L (140R) is formed by translucent resin painted in blue. Therefore, protection cover 140L (140R) is shone by light reflected from front edge section 122La (122Ra) to which aluminum is deposited. Therefore, outer edge sections 122L, 122R of reflector 120 can be more easily identified by an operation worker. Also, visibility of the outer section, for example visibility of headlight unit 100 from a vehicle or person in the opposite direction, especially the visibility of headlight unit 100 when headlight bulbs 150L, 150R are turned off, is improved.

In this embodiment, protection cover 140L (140R) is in a strip shape, and disposed in series along outer edge section 122L (122R). Therefore, front edge section 122La (122Ra) is more securely protected.

In this embodiment, front cowl 30 is disposed on straight line L1 that runs through bulb center CT of headlight bulb 150L (150R) and protection cover 140L (140R). Therefore, light colored blue when passing through protection cover 140L (140R) is not cast forward.

In this embodiment, side ends 140La, 140Lb (140Ra, 140Rb) of protection cover 140L (140R) are fit to slits 123La, 123Lb (123Ra, 123Rb). Therefore, even if protection cover 140L (140R) is a separate member from reflector 120, reflector 120 and protection cover 140L (140R) can be shown as if they are formed as a single unit.

(5) Other Embodiments

While the invention has been described based on embodiments thereof, it should be understood that the description and the drawings forming a part of this disclosure do not limit the scope of this invention. The disclosure may provide the skilled persons in the art with various alternatives.

Figure 9:
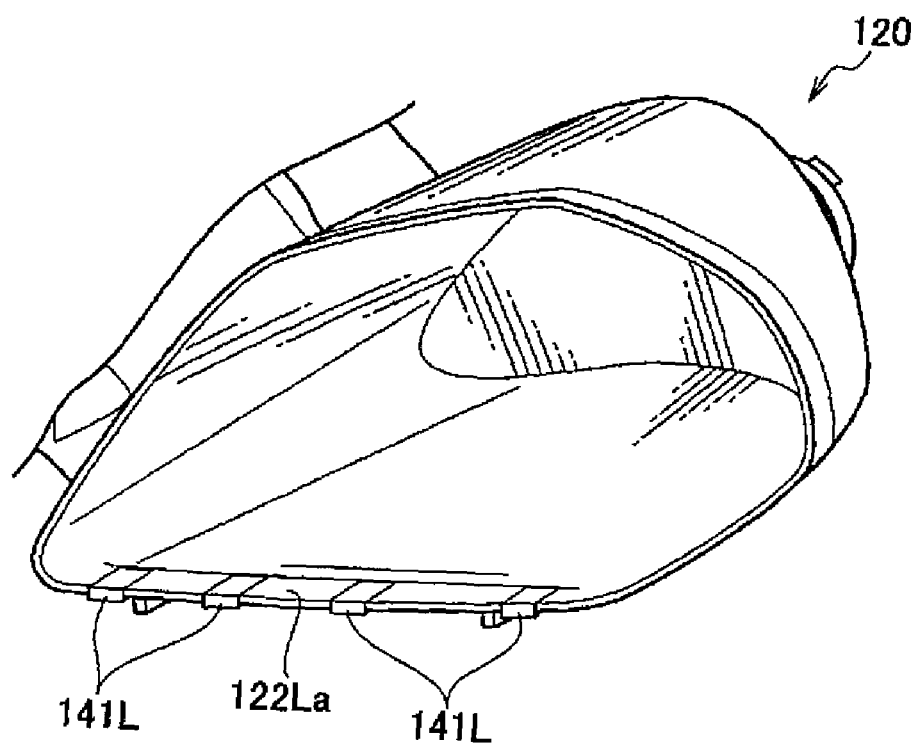
FIG. 9 is a partial perspective view of a reflector in accordance with an alternative example of the present invention.

For example, in the embodiments described above, protection cover 140L (140R) is in a strip shape, however, protection cover 140L (140R) may be in other shapes. As shown in FIG. 9, for example, a plurality of protection covers 141L that are smaller than protection cover 140L may be dotted on front edge section 122La of reflector 120.

Figure 10:
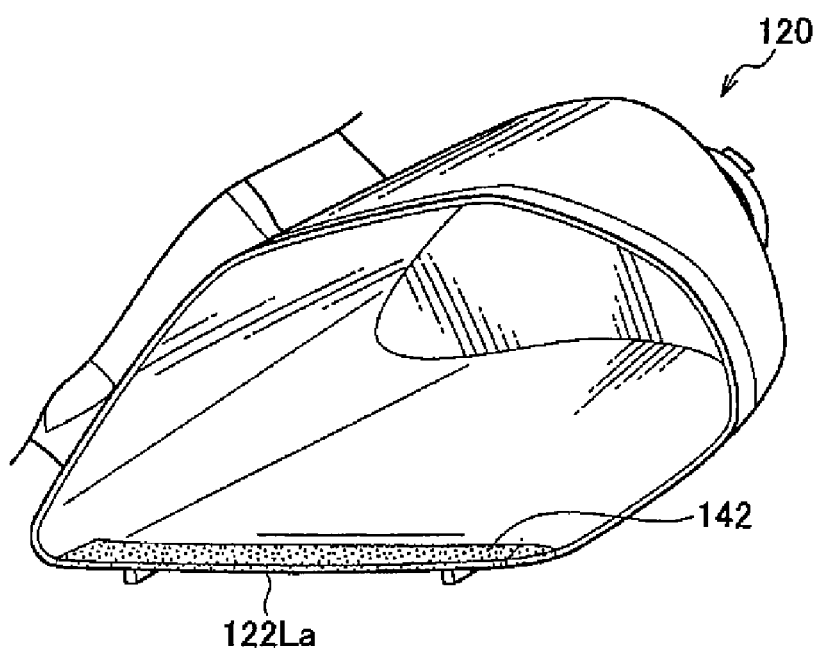
FIG. 10 is a partial perspective view of a reflector in accordance with an alternative example of the present invention.

Furthermore, as shown in FIG. 10, front edge section 122La may be covered by applying paint that protects front edge section 122La against damage. Front edge section 122La is protected by paint section 142 (cover section).

In the embodiments described above, protection cover 140L (140R) is painted in blue; however, protection cover 140L (140R) may be painted in colors other than blue, such as green for example. Also, light passing through protection cover 140L (140R) is not cast forward, so the color may be red which is the same as a brake lamp, or may be orange which is the same as a turn signal light.

In the embodiment described above, headlight unit 100 is a dual light type including headlight bulbs 150L, 150R. However, the headlight unit may also be a single light type.

Thus, the present invention includes various embodiments that are not specifically described herein. Accordingly, the scope of the invention is determined with reference to the following claims.

The invention claimed is:

1. A headlight unit comprising:
    a reflector having a concave shape and a reflection surface for reflecting light emitted by a headlight bulb in a desired direction;
    a cover section that covers at least part of an outer edge section of the reflection surface, and that has an appearance that is different from that of the reflection surface;
    a headlight lens; and
    a headlight body; wherein
    the cover section is directly attached to the outer edge section of the reflection surface so as to prevent damage to the reflection surface at the outer edge section of the reflection surface;
    the cover section is directly attached to the reflection surface at an inside surface of the reflector, and extends over the outer edge section of the reflection surface to an outside surface of the reflector;
    the cover section includes a concave section and the outer edge section of the reflection surface is fitted to the concave section of the cover section;
    the headlight lens is directly attached to the headlight body; and
    the cover section does not touch the headlight lens or the headlight body during normal operation of the headlight unit.

2. The headlight unit according to claim 1, wherein the cover section has a color that is different from a color of the reflection surface.

3. The headlight unit according to claim 1, wherein the cover section is disposed in series along the outer edge section.

4. The headlight unit according to claim 1, wherein the cover section is translucent.

5. The headlight unit according to claim 4, wherein
    the cover section is disposed at a lower portion of the outer edge section of the reflection surface,
    an exterior cover of a straddle-type vehicle is arranged in front of a lower portion of the reflector, and the exterior cover is arranged on a straight line running through at least a light emission center of the headlight bulb and the cover section in a side view of the straddle-type vehicle.

6. The headlight unit according to claim 1, wherein the cover section is a separate member from the reflector.

7. The headlight unit according to claim 6, wherein
a slit is provided on the outer edge section, and
a side end of the cover section is fitted into the slit.

8. The headlight unit according to claim 1, wherein the cover section is in a strip shape and arranged along the outer edge section.

9. The headlight unit according to claim 1, wherein the cover section comprises a plurality of protection covers provided along on the outer edge section.

10. The headlight unit according to claim 1, wherein the cover section includes paint applied to the outer edge section.

11. A straddle-type vehicle comprising:
the headlight unit according to claim 1.

12. The headlight unit according to claim 1, wherein the outer edge section of the reflection surface is a forward-most surface of the reflector.

13. The headlight unit according to claim 1, wherein:
the inside surface of the reflector includes at least a portion of the reflection surface; and
the outside surface of the reflector includes at least a portion of an exterior surface of the reflector that is substantially opposite the reflection surface.

14. The headlight unit according to claim 1, wherein:
the inside surface of the reflector includes a first surface of the reflector that faces the headlight bulb; and
the outside surface of the reflector includes a second surface of the reflector that faces the headlight body.

15. The headlight unit according to claim 1, wherein the concave section of the cover section is fitted to the outer edge section of the reflection surface such that a front edge of the cover section and the outer edge section of the reflection surface are aligned.

16. The headlight unit according to claim 1, wherein the concave section of the cover section and the outer edge section of the reflection surface have complementary shapes such that the concave section of the cover section is fitted into the outer edge section of the reflection surface.

17. The headlight unit according to claim 1,
wherein
the concave section of the cover section is disposed between the outer edge of the reflection surface and the headlight lens.

18. The headlight unit according to claim 17, wherein the concave section of the cover section is disposed between the outer edge of the reflection surface and the headlight lens such that the outer edge of the reflection surface is prevented from directly contacting the headlight lens.

19. The headlight unit according to claim 1, wherein at least a portion of the cover section is disposed directly underneath the reflector.

20. The headlight unit according to claim 1, wherein the outside surface of the reflector is disposed directly underneath the inside surface of the reflector.

* * * * *